US008615022B2

(12) United States Patent
Harrison et al.

(10) Patent No.: US 8,615,022 B2
(45) Date of Patent: *Dec. 24, 2013

(54) CLIENT/SERVER ADAPTATION SCHEME FOR COMMUNICATIONS TRAFFIC

(75) Inventors: Neil Harrison, Boughton (GB); Alan McGuire, Felixstowe (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 414 days.

This patent is subject to a terminal disclaimer.

(21) Appl. No.: 12/808,837

(22) PCT Filed: Dec. 19, 2008

(86) PCT No.: PCT/GB2008/004226
§ 371 (c)(1),
(2), (4) Date: Jun. 17, 2010

(87) PCT Pub. No.: WO2009/081139
PCT Pub. Date: Jul. 2, 2009

(65) Prior Publication Data
US 2010/0309924 A1    Dec. 9, 2010

Related U.S. Application Data

(63) Continuation-in-part of application No. 12/004,080, filed on Dec. 20, 2007, now Pat. No. 8,102,876.

(30) Foreign Application Priority Data

| Dec. 20, 2007 | (GB) | 0724936.0 |
| Jan. 14, 2008 | (GB) | 0800572.0 |
| Jan. 14, 2008 | (GB) | 0800573.8 |
| Jul. 31, 2008 | (GB) | 0814056.8 |

(51) Int. Cl.
*H04J 3/24* (2006.01)

(52) U.S. Cl.
USPC .................. 370/474; 370/235; 370/401

(58) Field of Classification Search
None
See application file for complete search history.

(56) References Cited

U.S. PATENT DOCUMENTS 6,937,571 B1 * 8/2005 Acharya et al. ............... 370/246
6,963,561 B1 * 11/2005 Lahat ........................... 370/356

(Continued)

FOREIGN PATENT DOCUMENTS

| CH | 1984028 A | 6/2007 |
| EP | 1 603 304 A | 12/2005 |
| EP | 1 603 307 | 12/2005 |
| EP | 1 657 839 | 5/2006 |
| WO | 2009/081139 A1 | 7/2009 |

OTHER PUBLICATIONS

International Search Report for PCT/GB2008/004226, mailed Apr. 21, 2009.

(Continued)

*Primary Examiner* — Robert Wilson
(74) *Attorney, Agent, or Firm* — Nixon & Vanderhye P.C.

(57) ABSTRACT

A communications network provides a carrier Ethernet service without requiring the client signal to be identified by an Ethertype in a carrier Ethernet frame. A plurality of differing types of client signals can thus be encapsulated within the same carrier Ethernet service channel by using a generic framing procedure adaptation layer. The client signals are adapted for encapsulation within the carrier Ethernet frames by mapping the client signal within a generic framing procedure adaptation layer signal and then by mapping the generic framing procedure adaptation layer signal into the carrier Ethernet signal. As the client signal is identified within said generic framing procedure signal only a generic framing signal Ethertype is required. The mapping protocol enables a single Ethernet frame to carry a plurality of client signals.

25 Claims, 12 Drawing Sheets

(56) References Cited

U.S. PATENT DOCUMENTS

| | | | | |
|---|---|---|---|---|
| 7,212,534 | B2* | 5/2007 | Kadambi et | 370/395.2 |
| 7,756,035 | B2* | 7/2010 | Bragg et al. | 370/235 |
| 8,102,876 | B2* | 1/2012 | McGuire | 370/466 |
| 2002/0083190 | A1* | 6/2002 | Kamiya et al. | 709/236 |
| 2005/0053064 | A1 | 3/2005 | Wang | |
| 2005/0238049 | A1 | 10/2005 | Delregno | |
| 2005/0271066 | A1 | 12/2005 | Valadarsky | |
| 2007/0098006 | A1 | 5/2007 | Parry et al. | |
| 2007/0116046 | A1 | 5/2007 | Liu et al. | |
| 2008/0037581 | A1 | 2/2008 | Asano | |
| 2008/0117895 | A1 | 5/2008 | De Heer | |
| 2008/0232366 | A1 | 9/2008 | He | |
| 2010/0309924 | A1* | 12/2010 | Harrison et al. | 370/401 |
| 2010/0309930 | A1* | 12/2010 | Harrison et al. | 370/474 |
| 2012/0039341 | A1* | 2/2012 | Latif et al. | 370/466 |

OTHER PUBLICATIONS

Generic framing procedure (GFP): G.7041/Y.1303 (Aug. 2005), *ITU-T Standard In Force (I), International Telecommunication Union*, Aug. 2005 XP017404569 (entire document).

Loring Wirbel, "Navy terminals support GFP", *EE-Times*, Dec. 2005, pp. 1-1, XP002522216.

International Search Report for PCT/GB2008/004210, mailed Apr. 15, 2009.

Loring Wirbel, "Navy terminals support GFP" EE-Times, Dec. 19, 2005, p. 1.1, XP002522216, Colorado Springs, Colorado (1 pg.).

"Generic Framing Procedure (GFP); G.7041/Y.1303 (Aug. 2005)", ITU-T standard in force (I), International Telecommunication Union, Geneva, CH, No. G7041/Y.1303 (Aug. 22, 2005, XP017404569) (64 pgs.).

* cited by examiner

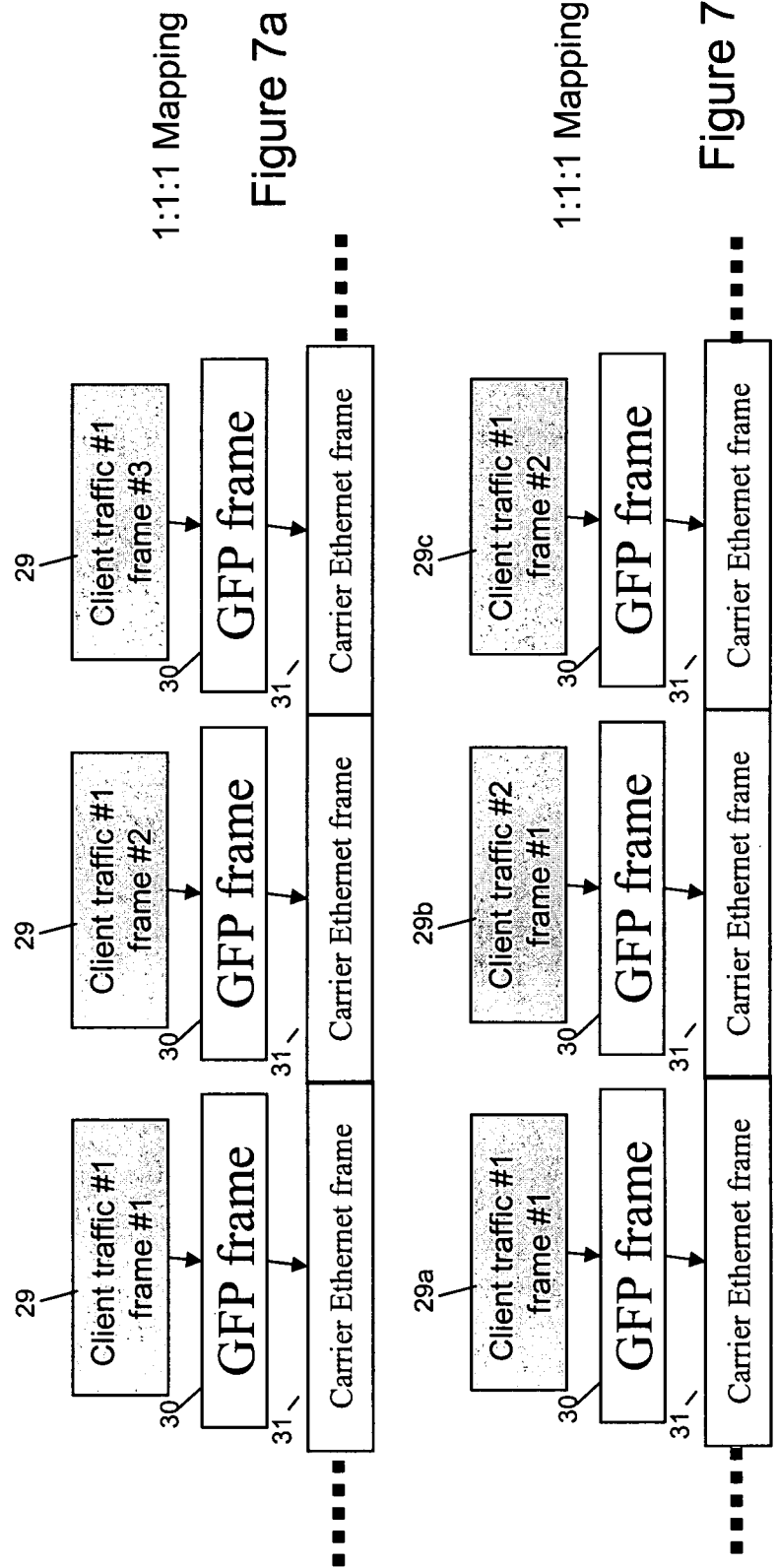

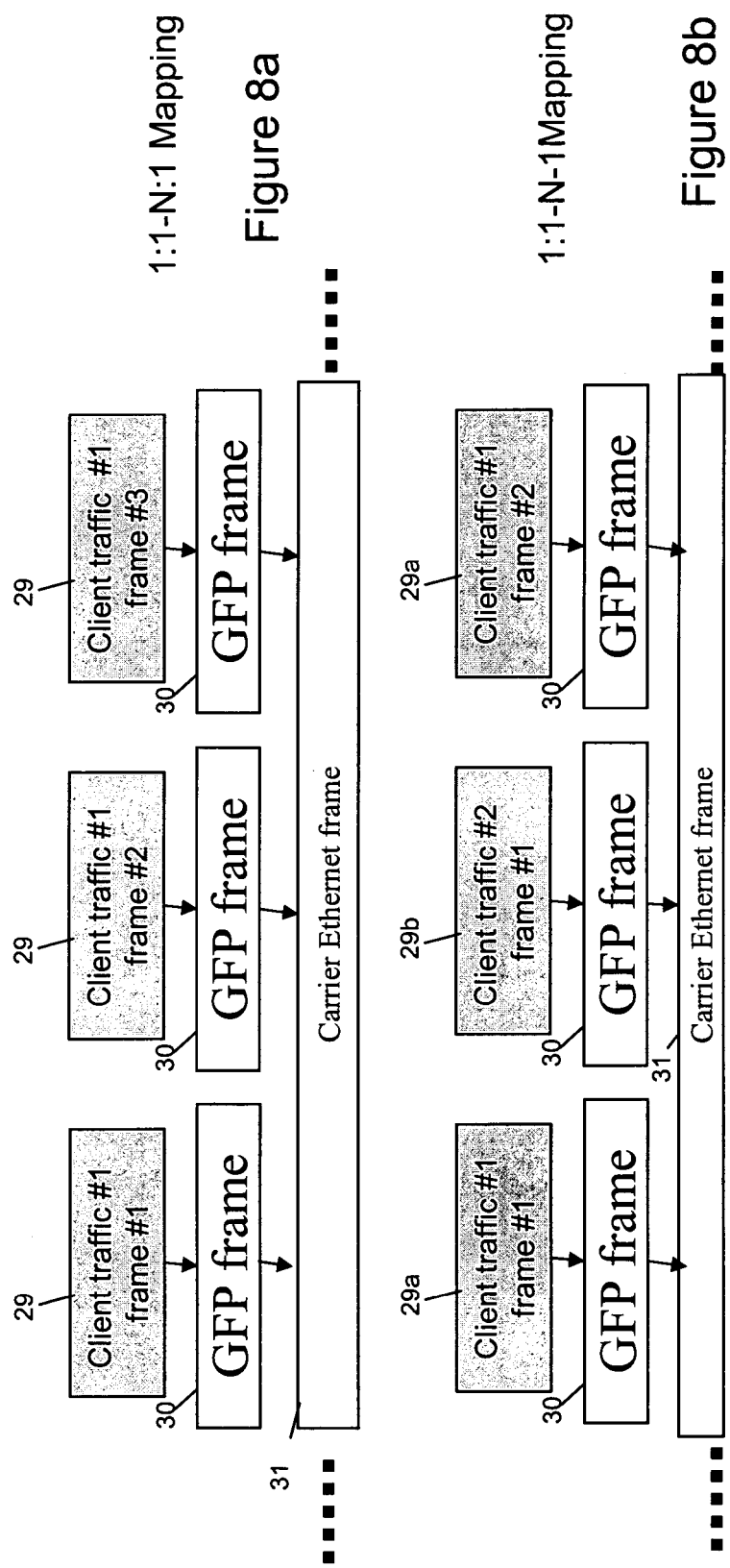
Figure 8a 1:1-N:1 Mapping
Figure 8b 1:1-N-1 Mapping

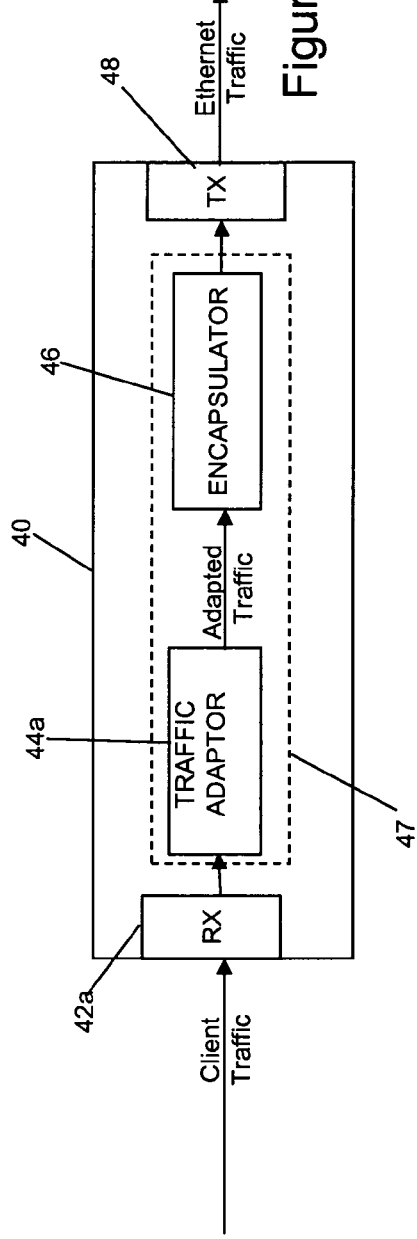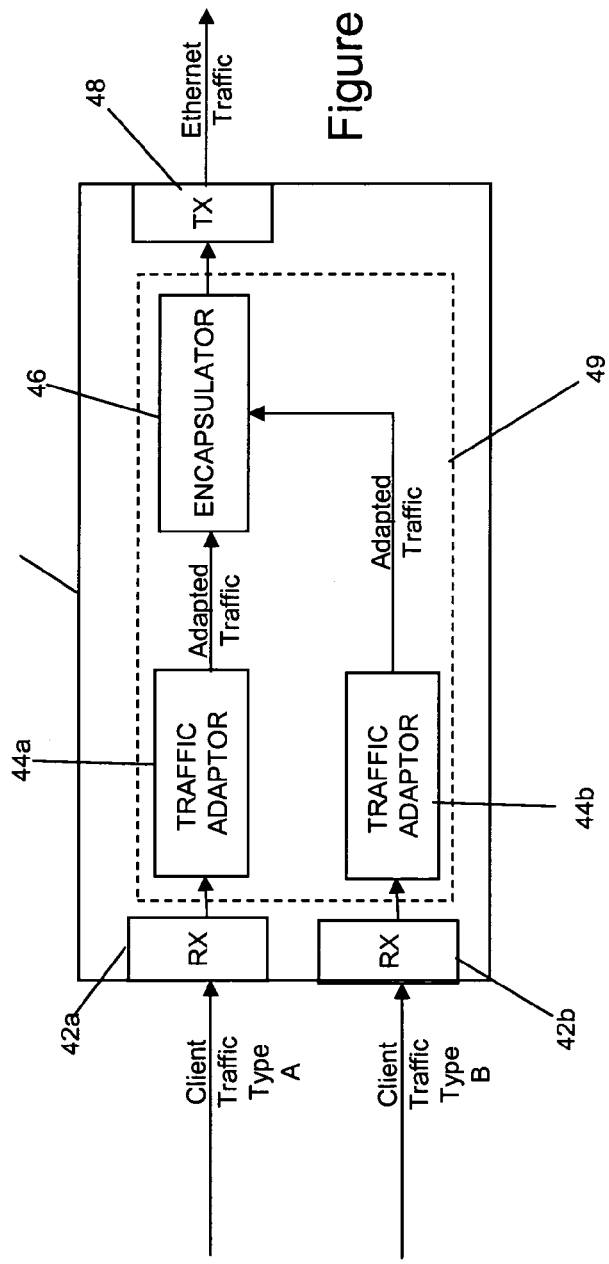

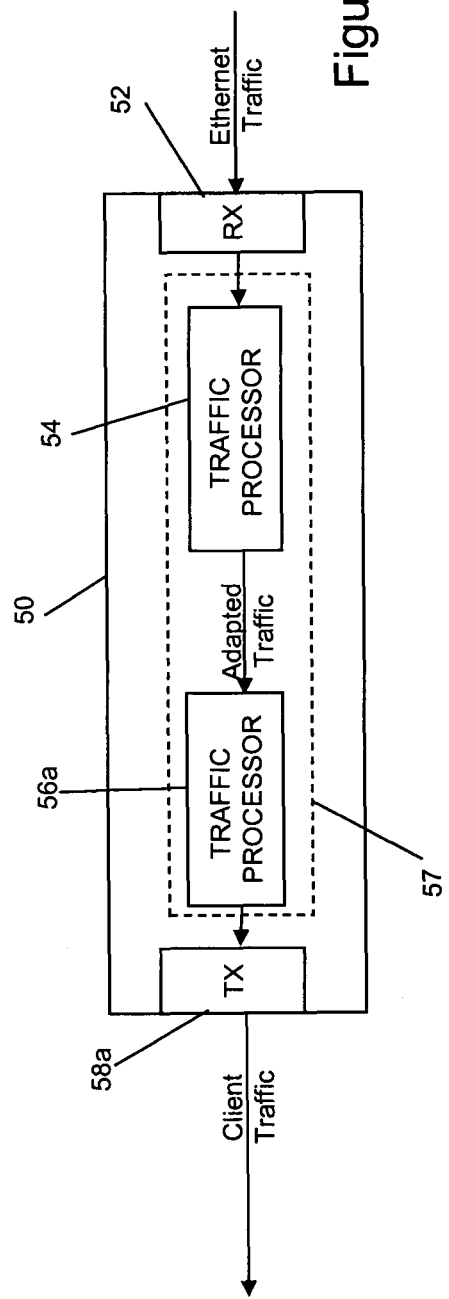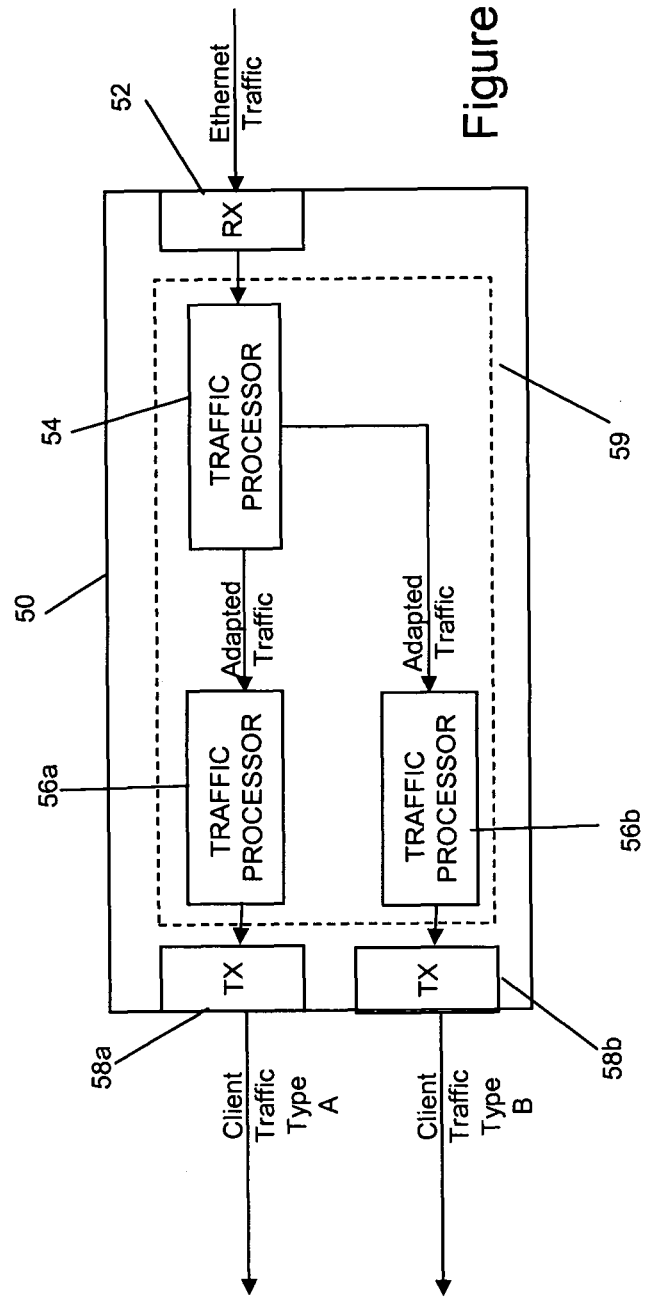

CLIENT/SERVER ADAPTATION SCHEME FOR COMMUNICATIONS TRAFFIC

This application is the U.S. national phase of International Application No. PCT/GB2008/004226 filed 19 Dec. 2008 which designated the U.S. and claims priority to GB Patent Application No. 0724936.0 filed 20 Dec. 2007, U.S. patent application Ser. No. 12/004,080 filed 20 Dec. 2007 to which the current application is a continuation-in-part, GB Patent Application Nos. 0800573.8 filed 14 Jan. 2008, 0800572.0 filed 14 Jan. 2008 and 0814056.8 filed 31 Jul. 2008, the entire contents of each of which are hereby incorporated by reference.

BACKGROUND

The present invention relates to a method of adapting client communications traffic for encapsulation within carrier Ethernet by providing an appropriate client/server adaptation mapping protocol for the traffic in a communications network and related aspects thereof.

In particular but not exclusively, the invention relates to a mapping protocol for a plurality of different types of client traffic into Ethernet traffic for transport over an Ethernet carrier network which removes the need for individual Ethertypes to identify the different types of client traffic.

Ethernet was originally devised as a connectionless packet based communications protocol for local area networks where each packet comprises an Ethernet frame. Here the term "packet" refers to a unit of data at any layer of the protocol stack, prior to or after transmission, whereas the term "frame" refers to a unit of data transferred across the network, defined at the datalink (network access) layer of the Open Systems Interconnection (OSI) protocol stack.

More recently, however, Ethernet standards are emerging that have extended the reach of the communications protocol to wider area networks such as the Provider Backbone Bridging (PBB) developed in the International Electrical and Electronic Engineering (IEEE) standards body as 802.1ah. This allows the transparent carriage of a client Ethernet layer network over a server Ethernet layer network. However, since the server Ethernet layer network is connectionless it cannot provide any strong resource assurances to the client Ethernet layer network.

To address this Provider Backbone Bridging—Traffic Engineered (PBB-TE) is also being developed by the IEEE as the 802.1Qay standard. The proposed 802.1Qay standard describes how an Ethernet hierarchy can be implemented to transparently carry conventional (connectionless) Ethernet client LANs over a connection-oriented packet-switched transport network infrastructure as a carrier service. However, where a PBB-TE carrier network is provided problems exist when other non-Ethernet traffic is to be transported over the PBB-TE network. This is not possible using the existing 802.1ah frame structure which is predicated on an Ethernet client.

PBB-TE is a connection-oriented Ethernet protocol which enables connectionless Ethernet to be carried as a client signal in the connection-oriented Ethernet layer using Media Access Control (MAC) in MAC encapsulation. Non-Ethernet client signals do not require MAC in MAC encapsulation. Moreover, it is desirable for non-Ethernet clients to be carried directly over a PBB-TE network using 802.1ad specified Ethernet equipment. This requires the client protocol to be identified using an Ethertype which acts as the protocol identifier. However, this is a far from ideal solution as many non-Ethernet clients do not have an Ethertype currently specified (and may never get such Ethertypes).

Whatever form of Ethernet to be used as a carrier technology, either in its connectionless or connection-oriented form, client traffic must be identified. The term client traffic refers herein to traffic originating in a network which consumes bandwidth available in another network for communications purposes. The network whose bandwidth is consumed by client traffic is referred to herein as a carrier network. A client traffic signal can comprise a communications signal corresponding to another communications protocol from the communications protocol used by the carrier network. The connection-oriented packet-switched and connectionless Ethernet standards require client data which is encapsulated within the payload of an Ethernet frame to be identified by means of a predetermined field value in the Ethernet frame header referred to by those of ordinary skill in the art as an "Ethertype". Each different type of communications protocol requires an Ethertype identifier before, it can be transported using Ethernet. To obtain an Ethertype, an application is submitted to the IEEE Ethernet standards body which is a time-consuming process.

Accordingly, a problem exists in that client traffic cannot be encapsulated within carrier Ethernet unless an Ethertype already exists for that client traffic type. A possible solution would be to request new Ethertypes for all the possible types of client traffic (in addition to Ethernet) that one may wish to carry in advance. Another possible solution is to map the client Ethernet frames into other technologies instead of using an Ethernet-based server layer network. For example, in the Synchronous Digital Hierarchy/Synchronous Optical NETwork (SDH/SONET) and Optical Transport Network (OTN) communication protocols the standardised mechanism is to use Generic Framing Procedure (GFP) and on a Passive Optical Network PON a similar mechanism known as GPON Encapsulation Mode (GEM) is used. This does not, of course, resolve the problem of how to carry such clients over an Ethernet-based server layer network.

Accordingly, to overcome the problems associated with 'client identification' in a client/server layer network when the server layer is Ethernet (including PBB and PBB-TE variants) without requiring an Ethertype for each specific client case, one embodiment of the invention proposes a mapping scheme in which client traffic is first mapped to a GFP adaptation layer prior to being mapped to a carrier Ethernet frame. By mapping one frame of client traffic to one GFP frame it is possible that the GFP frame size exceeds that of a standard Ethernet carrier frame, in which case a larger size Ethernet frame may be provided. However, this may result in a bandwidth inefficient mapping scheme.

Conventionally, it is not possible for an Ethernet frame to carry more than one type of client traffic within its payload as no mechanism exists to identify the type of client traffic contained. However, as the adaptation layer is consistent for different types of client traffic according to the invention it is possible to map more than one GFP frame carrying the same or different client traffic types (for example, the same traffic but from different sources or different types of client traffic communications protocols (especially where these are from the same source) within an Ethernet frame of sufficient size, for example within a so-called Jumbo Ethernet frame We thus now only require an Ethertype for GFP and not each of the clients that are carried. The problem of client identification has not disappeared however, but it is now resolved within GFP.

BRIEF SUMMARY

A first aspect of the invention seeks to provide a method of adapting a client signal for encapsulation within a carrier Ethernet signal, the method comprising: mapping said client signal within an generic framing procedure adaptation layer signal; and mapping said generic framing procedure adaptation layer signal into said carrier Ethernet signal, wherein said client signal is identified within said generic framing procedure signal.

Each said carrier Ethernet signal may carry a plurality of different client signals.

A frame of said client signal may be mapped within a frame of said carrier Ethernet signal.

A plurality of frames of said client signal may be mapped within a frame of said carrier Ethernet signal.

The carrier Ethernet signal may conform to a connection-oriented packet switched Ethernet communications protocol. Alternatively, the carrier Ethernet signal may conform to a connectionless Ethernet communications protocol.

The mapping of said generic framing procedure adaptation layer signal into said carrier Ethernet signal may comprise mapping a plurality of frames of said generic framing procedure protocol to an Ethernet frame.

The term mapping is used here in a functionality equivalent manner to encapsulation. For example, a protocol data unit of a client frame may be encapsulated within a generic framing procedure service data unit and the protocol data unit of the generic framing procedure may be encapsulated within the service data unit (payload area) of an Ethernet frame. The term mapper similarly refers herein to a component which performs a function equivalent to that of encapsulation.

The plurality of frames of said generic framing procedure protocol may each encapsulate a frame of said client signal, and said plurality of frames of said generic framing procedure protocol may each be encapsulated within said Ethernet frame.

At least one of said plurality of frames of said generic framing procedure protocol may encapsulate a client signal frame which conforms to a communications protocol different from the communications protocol of other client signals encapsulated in other ones of said plurality of frames of said generic framing procedure protocol, and said plurality of frames of said generic framing procedure protocol carrying the client signals conforming to differing communications protocols may be encapsulated within a said Ethernet frame.

The method aspect may further comprise determining the amount of payload required to convey a frame of said encapsulated client traffic and verifying the payload required is available in a frame of said carrier Ethernet signal.

The carrier Ethernet signal may comprise Jumbo Ethernet frames.

The generic framing procedure adaptation layer signal may be identified in the carrier Ethernet signal. The generic framing procedure adaptation layer signal may be identified in each frame of the carrier Ethernet signal by the Ethertype value provided in the Ethertype field of the frame header.

Another aspect of the invention seeks to provide a method of de-encapsulating a client signal encapsulated within a carrier Ethernet frame, the method comprising: receiving the carrier Ethernet signal; determining a generic framing procedure adaptation layer signal is encapsulated within said carrier Ethernet signal; processing said generic framing procedure signal to identify said client signal within said generic framing procedure signal, and de-encapsulating said client signal from said generic framing procedure adaptation layer signal.

Each received Ethernet frame header may be processed to determine if its payload comprises generic framing procedure data by identifying if the Ethernet frame header contains an Ethertype indicating the Ethernet payload area comprises generic framing procedure communications data.

The Ethernet payload area may be processed to determine from said generic framing procedure data the position and length of the client signal encapsulated within the Ethernet payload area in order to de-encapsulate the client signal. The client signal may remain encapsulated within the generic framing procedure frame.

A plurality of client signals may be encapsulated within the payload of each carrier Ethernet frame and the method aspect may further comprise processing the Ethernet payload area until all of the client signals are de-encapsulated.

The plurality of said client signals may be encapsulated within a generic framing procedure frame within each Ethernet frame.

Another aspect of the invention seeks to provide a method of de-encapsulating a client signal encapsulated within a carrier Ethernet frame, the method comprising: de-encapsulating said generic framing procedure adaptation layer signal from said carrier Ethernet signal to extract a plurality of generic framing procedure frames; processing each said de-encapsulated frame of said generic framing procedure signal to identify a frame of said client signal within said generic framing procedure signal, and de-encapsulating each said frame of said client signal from said generic framing procedure adaptation layer signal.

Another aspect of the invention seeks to provide apparatus comprising means arranged to implement steps in any of the above method aspects.

Another aspect of the invention seeks to provide apparatus arranged to adapt a client signal for encapsulation within a carrier Ethernet signal, the apparatus comprising: a first protocol mapper arranged to map said client signal within an generic framing procedure adaptation layer signal; a second protocol mapper arranged to map said generic framing procedure adaptation layer signal into said carrier Ethernet signal, whereby said client signal is identified within said generic framing procedure signal.

Each said Ethernet carrier signal may carry a plurality of different client signals.

A frame of said client signal may be mapped within a frame of said carrier Ethernet signal.

A plurality of frames of said client signal may be mapped within a frame of said carrier Ethernet signal.

The plurality of frames of said client signals may be encapsulated within a generic framing procedure frame within each Ethernet frame.

The carrier Ethernet signal may conform to a connection-oriented packet switched Ethernet communications protocol.

The carrier Ethernet signal may conform to a connectionless Ethernet communications protocol.

The second mapper may map said generic framing procedure adaptation layer signal into said carrier Ethernet signal by mapping a plurality of frames of said generic framing procedure protocol to an Ethernet frame.

The plurality of frames of said generic framing procedure protocol may each encapsulate a frame of said client signal, and said plurality of frames of said generic framing procedure protocol may be encapsulated within said Ethernet frame.

At least one of said plurality of frames of said generic framing procedure protocol may encapsulate a frame of a communications protocol of client signal different from the communications protocol of client signals encapsulated in other ones of said plurality of frames of said generic framing procedure protocol. The plurality of frames of said generic framing procedure protocol carrying the different client signals may be encapsulated within a said Ethernet frame.

The second mapper may comprise a processing component which determines the amount of payload required to convey a frame of said encapsulated client traffic and verifies the payload required is available in a frame of said carrier Ethernet signal.

The generic framing procedure adaptation layer signal may be identified in the carrier Ethernet signal. The generic framing procedure adaptation layer signal may be identified in each frame of the carrier Ethernet signal by the Ethertype value provided in the Ethertype field of the frame header.

Another aspect of the invention seeks to provide apparatus arranged to de-encapsulate a client signal encapsulated within a carrier Ethernet frame, the apparatus comprising: a receiver arranged to receive the carrier Ethernet signal; a first signal processor arranged to determine if a generic framing procedure adaptation layer signal is encapsulated within said carrier Ethernet signal; a second signal processor arranged to process said generic framing procedure signal to identify said client signal within said generic framing procedure signal, and a third signal processor arranged to de-encapsulate said client signal from said generic framing procedure adaptation layer signal.

The functionality two or more of said signal processors implement may be provided by the same signal processing component in said apparatus.

Each received Ethernet frame header may be processed to determine if its payload comprises generic framing procedure data by identifying if the Ethernet frame header contains an Ethertype indicating the Ethernet payload area comprises generic framing procedure communications data.

The Ethernet payload area may be processed to determine from said generic framing procedure data the position and length of the client signal encapsulated within the Ethernet payload area in order to de-encapsulate the client signal.

The client signal may be encapsulated in GFP then in the Ethernet payload area.

A plurality of client signals may be encapsulated within the payload of each carrier Ethernet frame and the apparatus may further comprises a processing component arranged to process the Ethernet payload area until all of the client signals are de-encapsulated.

Another aspect of the invention seeks to provide apparatus arranged to de-encapsulate the client signal from within a carrier Ethernet frame, the apparatus comprising: a first mapper arranged to de-encapsulate said generic framing procedure adaptation layer signal from said carrier Ethernet signal to extract a plurality of generic framing procedure frames; a signal processor arranged to process each said de-encapsulated frame of said generic framing procedure signal to identify a frame of said client signal within said generic framing procedure signal, and a second mapper arranged to de-encapsulate each said frame of said client signal from said generic framing procedure adaptation layer signal.

Another aspect of the invention seeks to provide a computer program product comprising one or more computer programs configured to be operable to implement steps in any of the method aspects of the invention.

Embodiments of the invention may be implemented using any appropriate combination of software and/or hardware components and may be implemented by installing one or more computer programs which then operate on one or more computing platforms to implement steps according to any of the method aspects and embodiments of the invention and/or to configure apparatus to implement such method steps. Such computer programs may be stored on any appropriate form of computer readable media and/or distributed as an electronic signal over a communications network.

A computer program product may comprise a stored form of one or more such computer programs which collectively or individually are arranged to implement an embodiment of the invention when executed using appropriate hardware.

Aspects of the present invention are as set out above and in the accompanying claims, and the preferred embodiments are as set out above and by the accompanying dependent claims.

Those of ordinary skill in the art will be aware that the invention comprises any appropriate combination of the aspects and preferred embodiments as set out herein and in the claims where the suitability of such combination is apparent to one of ordinary skill in the art.

In this way embodiments of the invention seek to provide a communications network which provides a carrier Ethernet service without requiring the client signal to be identified directly by an Ethertype in a carrier Ethernet frame. A plurality of differing types of client signals can thus be encapsulated within the same carrier Ethernet service channel by using a generic framing procedure adaptation layer. The client signals are adapted for encapsulation within the carrier Ethernet frames by mapping the client signal within a generic framing procedure adaptation layer signal and then by mapping the generic framing procedure adaptation layer signal into the carrier Ethernet signal. As the client signal is identified within said generic framing procedure signal only a generic framing signal Ethertype is required. The mapping protocol enables a single Ethernet frame to carry a plurality of client signals.

BRIEF DESCRIPTION OF THE DRAWINGS

The preferred embodiments of the invention will now be discussed with reference to the accompanying drawings which are by way of example only and in which:

FIGS. 7a and 7b show 1:1:1 mapping schemes according to embodiments of the invention;

FIGS. 8a and 8b show 1:1 followed by N:1 mapping schemes according to embodiments of the invention FIG. 9A shows a network node arranged to provide client data with access to an Ethernet carrier network according to an embodiment of the invention;

FIG. 9B shows a network node arranged to provide client data with access to an Ethernet carrier network according to another embodiment of the invention;

FIG. 10A shows a network node arranged to extract client data from a carrier signal provided by an Ethernet carrier network according to an embodiment of the invention; and FIG. 10B shows a network node arranged to extract client data from a carrier signal provided by an Ethernet carrier network according to another embodiment of the invention.

DETAILED DESCRIPTION OF PRESENT EXAMPLE EMBODIMENTS

The best mode of the invention will now be described. Those of ordinary skill in the art will be aware that the description of the invention has been simplified for clarity and may omit to refer explicitly to features which are apparent and already known to those of ordinary skill in the art as essential for its implementation, such features being implicitly included in the description of the invention. The description may also omit to mention alternative features which are functionally equivalent to the features recited herein and where such alternatives are well known to those of ordinary skill in the art their inclusion is also implicit by reference.

Figure 1A:
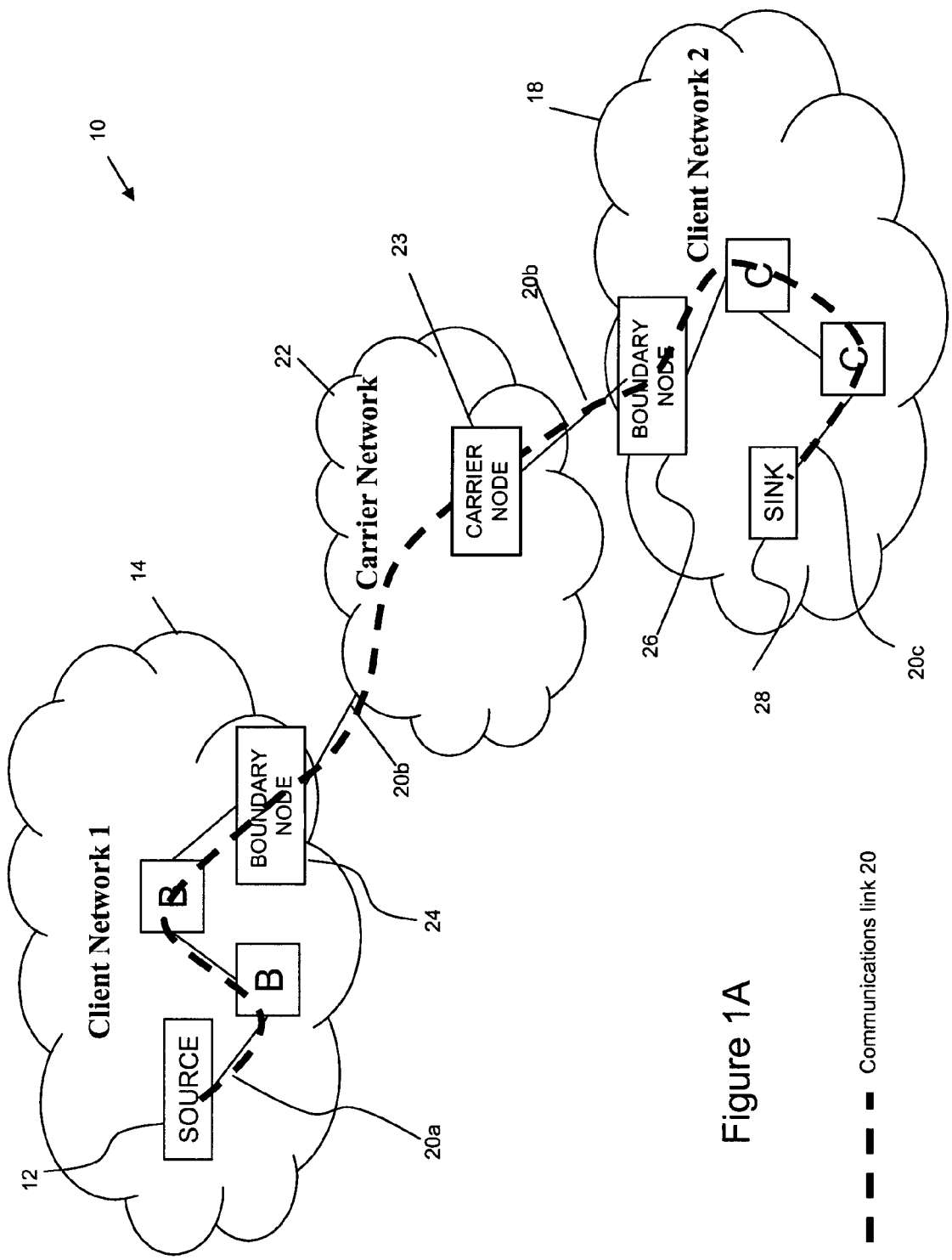
FIG. 1A shows a communications link established between two client networks across a carrier network.

FIG. 1A shows a communications system 10 comprising a carrier network 22 arranged to transport one or more types of communications data using an Ethernet communications protocol. In the communications system 10 a communications link 20 is established between two client networks 14, 18 across the carrier network 22. In FIG. 1A, a source 12 of traffic in client network 14 generates traffic for a destination address (shown as sink 28) in another client network 18 which requires a path (shown in FIG. 1 by the thick dashed line of communications link 20) to be established over carrier network 22. As is well known in the art, carrier network 22 in fact comprises a number of interconnected network nodes but for clarity and brevity of the description only one, node 23, is shown in FIG. 1A. The communications link 20 comprises in part a communications link 20a within the client network 14 which transports traffic according to a communications protocol supported by the source 12 of client traffic. The partial communications link 20a is shown in FIG. 1A as passing via one or more optional intermediate client network nodes "B" before reaching a boundary node 24 between the first client network 14 and the carrier network 22. At this first boundary node 24, traffic conforming to a communications protocol supported by the client network 14 is mapped to a communications protocol supported by the carrier network 22 using a method of adapting a client signal for encapsulation within a carrier Ethernet signal according to an embodiment of the invention. FIGS. 9A and 9B of the accompanying drawings described in more detail herein below show the internal functional structure of boundary nodes which are arranged to map client traffic into the Ethernet carrier traffic.

Figure 1B:
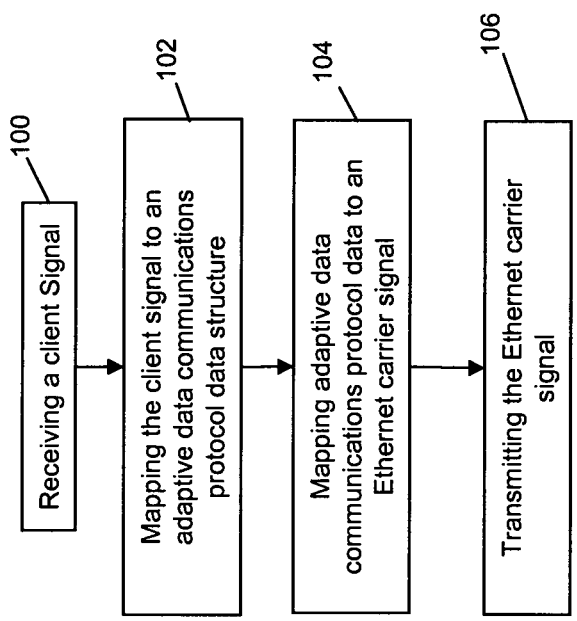
FIG. 1B shows steps in a method of adapting client signals for transport over an Ethernet carrier network according to an embodiment of the invention.

FIG. 1B shows a method of adapting a client signal for encapsulation within a carrier Ethernet signal according to an embodiment of the invention in which boundary node 24 receives a client signal comprising client traffic conforming to a first communications protocol (100). The client signal is then mapped to an adaptive data communications protocol data structure (102), for example to a packet conforming to the generic framing procedure (GFP) communications protocol. An adaptive data communications protocol comprises a protocol specific layer and also a protocol generic layer. For example, see the GFP communications protocol shown in FIG. 5 and described in more detail herein below. The adaptive data communications protocol signal is then mapped into a carrier Ethernet signal (104) and transmitted over the carrier network (106). The client signal is identified within said adaptive data communications protocol signal by an appropriate data structure and the adaptive data communications protocol signal is identified within the Ethernet signal by an Ethertype or other appropriate data structure. For example, one or more of the type of protocol, the length of the client data, and the position of the client data within the service area of each adaptive data communications protocol signal may be provided sufficient to enable the client signal to be extracted from the adaptive payload area once the adaptive payload area within each Ethernet carrier frame has been identified. For example, the generic framing procedure signal may be identified within said carrier Ethernet signal by an Ethertype value in the header of an Ethernet frame which indicates that the payload contents of that frame comprise data conforming to the generic framing procedure communications protocol. Although not shown in FIG. 1B, in one embodiment, the boundary node 24 also determines the amount of payload required to convey a frame of said encapsulated client traffic and verifies the payload required is available in a frame of said carrier Ethernet signal prior to mapping the client traffic to a the adaptive communications protocol and/or to mapping the adaptive communications protocol to the carrier signal.

The method of encapsulating client data according to the invention enables a single carrier Ethernet communications channel to carry generic framing procedure adaptation layer data which comprises a single client traffic signal or a plurality of different client traffic signals. The signals can be mapped through the same adaptation processor (44a) as FIG. 9A shows or through different adaptation processors (44a,b) as FIG. 9B shows. One of more of the plurality of different client signals may conform to different communications protocols, each type of communication protocol being identified in each frame of said generic framing procedure adaptation layer communications protocol data. In one embodiment, a frame of client traffic is mapped to a carrier Ethernet frame, alternatively, however, a plurality of frames of said client signal are mapped within a frame of said carrier Ethernet signal. This is achieved by either mapping multiple clients into a GFP frame or alternatively by mapping multiple GFP frames into an Ethernet frame. One way of achieving the later is provided by including a frame sequence indicator in an extension field of the GFP or by using another suitable mechanism apparent to one of ordinary skill in the art capable of indicating the GFP frame sequence order. Similarly, where a plurality of client signals are mapping into a GFP frame, an indicator of the number of frames can be provided by using a GFP or client signal extension field or sub-field as appropriate. An embodiment of the invention in which a plurality of generic framing procedure protocol packets are mapped into an Ethernet frame is described herein below with reference to FIGS. 8a and 8b of the accompanying drawings.

The carrier Ethernet signal in one embodiment of the invention conforms to a connection-oriented Ethernet communications protocol, for example, a connection-oriented packet switched Ethernet communications protocol such as PBT or PBB-TE, alternatively, however, the carrier Ethernet signal conforms to a connectionless Ethernet communications protocol. In one embodiment, the carrier Ethernet signal comprises Jumbo Ethernet frames.

The mapped communications traffic is then transported along a communications link 20b over the carrier network to a second boundary node 26 of the destination client network 18, where the client communications traffic is recovered using a method of de-encapsulating a client signal encapsulated within a carrier Ethernet frame according to the invention.

Figure 1C:
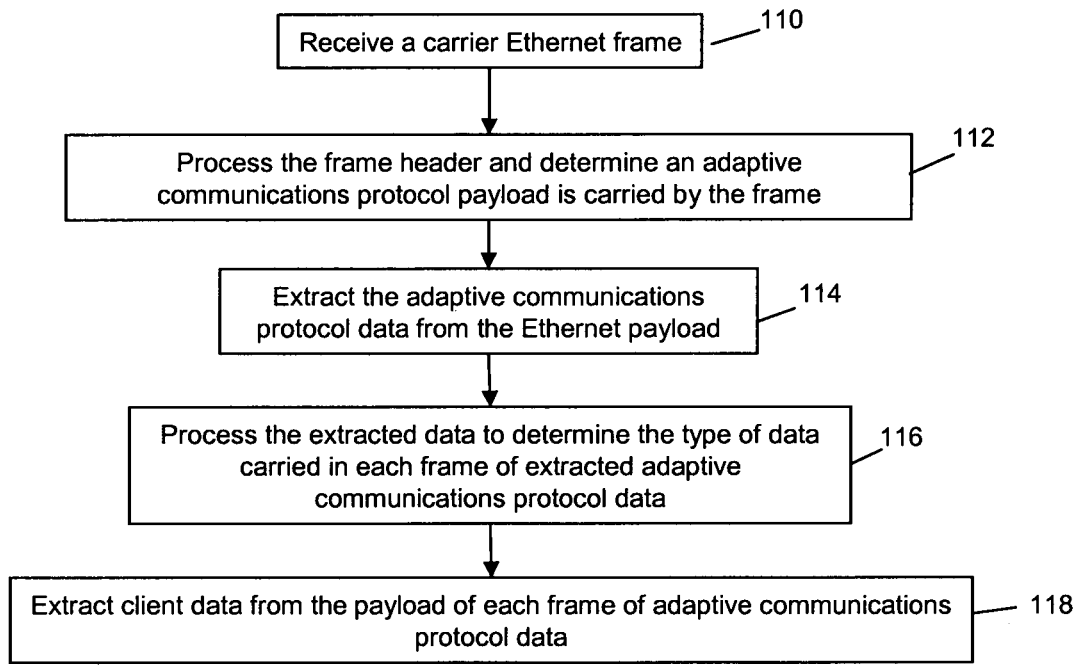
FIG. 1C shows steps in a method of de-encapsulating one or more client signals encapsulated within an Ethernet frame according to an embodiment of the invention.

FIG. 1C shows a method of de-encapsulating a client signal encapsulated within a carrier Ethernet frame according to one embodiment of the invention in which a boundary node 26 receives an Ethernet frame (110), processes the frame header and determines from the Ethertype that the Ethernet frame payload comprises adaptive communications protocol data (112). The node 26 then extracts the adaptive communications protocol data from the Ethernet payload (114) and processes the extracted data to determine the type of data carried in each extracted frame of adaptive communications protocol data (116). In one embodiment where more than one frame is extracted the extraction process requires reading the extension field of the GFP frame to determine from the field or from a sub-field a value which indicates the position of the GFP frame in a sequence of frames. For example, if two bits are used, the value 01 can be used for the beginning of the sequence, 00 for the middle, and 11 for the end of the sequence of frames The node 26 then extracts client data from the payload of each adaptive communications protocol data frame (step 118). If node 26 is not the destination of the client data (as is the case in FIG. 1A), the node 26 then forwards the extracted client data to another node in the client network 18.

Figure 1D:
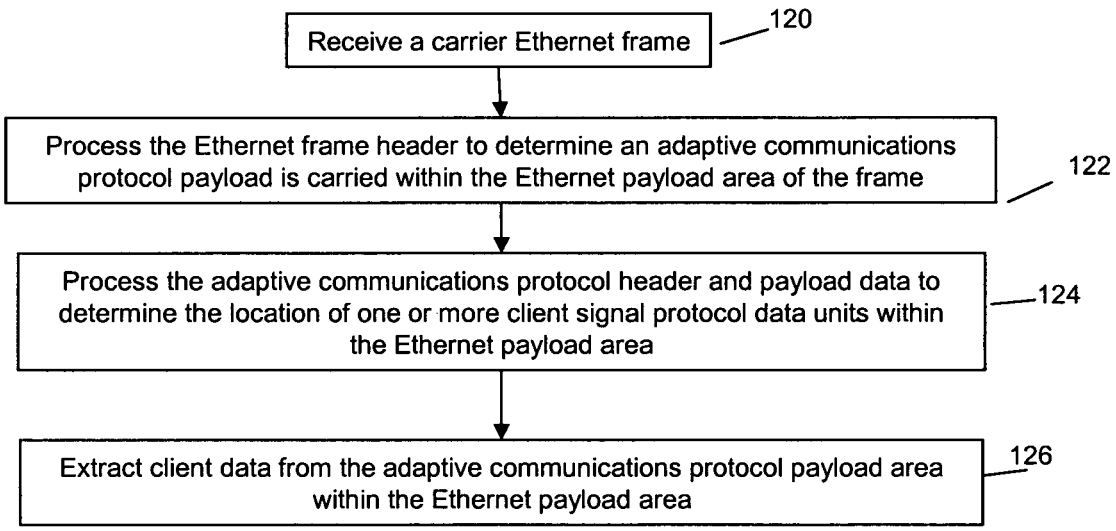
FIG. 1D shows steps in a method of de-encapsulating one or more client signals encapsulated within an Ethernet frame according to another embodiment of the invention.

FIG. 1D shows another embodiment of a method of de-encapsulating a client signal according to the invention in which the adaptive layer data is not explicitly de-encapsulated from the carrier Ethernet frame. Instead, when a carrier Ethernet frame is received (step 120), the Ethernet frame header is processed to determine the type of payload carried from the Ethertype value provided in the Ethertype field if the Ethernet carrier frame payload comprises data conforming to an adaptive communications protocol (step 122). The adaptive communications protocol header is then processed to determine the length of the payload data encapsulated in the adaptive communications protocol payload area and may also process other parts of the adaptive communications protocol service unit, for example the payload information area to determine if an extension header is also provided, in order to locate the client signal data (step 124). Once the position of the client signal data encapsulated within the adaptation layer has been determined, the client signal data can be de-encapsulated directly from within the Ethernet carrier frame (step 126). FIGS. 10A and 10B of the accompanying drawings each show more detail of a boundary node 26 arranged to perform a method of de-encapsulating a client signal from a carrier frame according to an embodiment of the invention.

The final portion of the communications link 20 shown in FIG. 1A comprises partial link 20c is within the destination client network 18 and is shown as passing via one or more optional intermediate network nodes "C" before reaching its destination 28.

At the boundaries between the client networks 14, 18 and the carrier network 22 the client traffic communications protocol(s) must be mapped into the carrier (also referred to herein as the server) traffic communications protocol.

Many adaptation schemes are already known in the art for mapping client traffic into server traffic where the traffic is to be carried between two geographically separated parts of a client network 14, 18 over a Synchronous Digital Hierarchy carrier network 22. However, where the carrier communications protocol is Ethernet, it is essential for the client communications protocol to be identified within the header of the Ethernet frame. This requires an Ethertype field value to be provided for each type of client communications protocol.

Previously, the number of Ethertypes required was limited as Ethernet was not used as a wide area network carrier technology for carrying other wide area network clients. However, now that connection-oriented packet-switched Ethernet communications protocols are being developed through standards bodies, a problem exists in that it is desirable to be able to carry many different types of communications traffic without needing to apply to a standards body in advance for an Ethertype for each different type of client communications traffic protocol.

Figure 2:
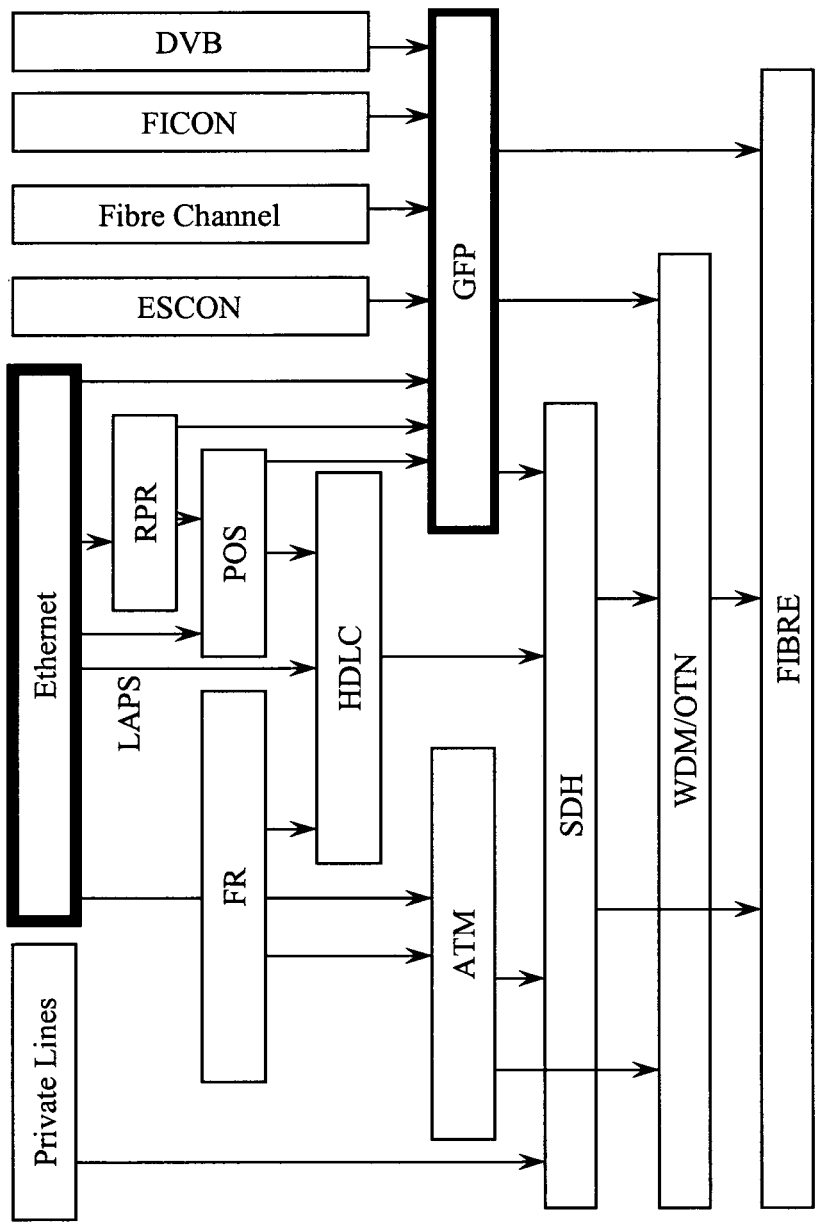
FIG. 2 shows the relationship between a number of different protocols and GFP as is known in the art.

A large number of different types of communications traffic conforming to a number of different communications protocols could form client traffic where Ethernet is providing the carrier network communications protocol. For example, FIG. 2 shows a plurality of different network infrastructure technologies and how they are known to be mapped into each other for transport purposes. For example, traffic carried by private lines can be transported using SDH, which in turn may be carried directly over the physical layer (for example Fibre as shown in FIG. 3) or carried via a wavelength division multiplexed (WDM) or optical transport network (OTN) protocol on top of the Fibre channel.

It is known in the art that Ethernet traffic can be transported using Asynchronous Transport Mode (ATM), High-level Data-Link Control (HDLC) either directly or via Resilient Packet Ring (RPR) mapped into Packet Over SONET (POS) which is based on PPP. Ethernet can also be carried using the Generic Framing Protocol (see ITU-T G.7041 standard for more details of GFP and its use for mapping data protocols or clients for transport over SDH transmission networks) directly or via RPR being mapped into GFP. GFP can carry a range of protocols, for example, Enterprise Systems CONnectivity architecture technology (ESCON), Fibre Channel, Fibre Connectivity (FICON), and Digital Video Broadcasting (DVB) technology. ATM is also used to carry Frame Relay (FR). As shown in FIG. 2, it is known in the art for SDH to carry a range of communications protocols encapsulated in its payload, for example, private lines, ATM, HDLC and GFP. Wave Division Multiplexing/Optical Transport Networks can carry SDH, GFP and ATM. SDH and WDM/OTN and GFP are all capable of being carried over fibre.

Figure 3:
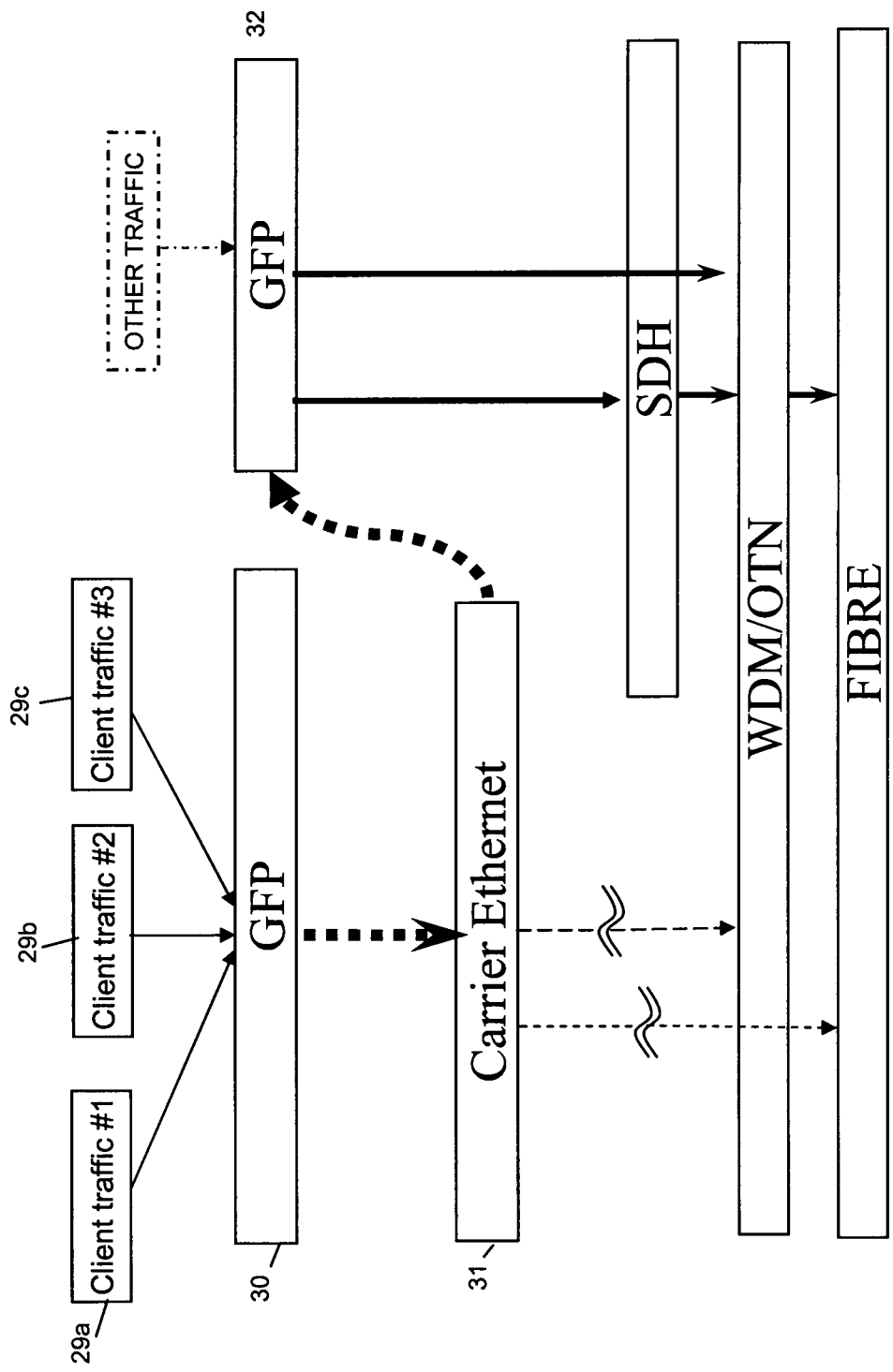
FIG. 3 shows a client/server adaptation scheme according to an embodiment of the invention.

In FIG. 3 of the accompanying drawings a plurality of different types of client traffic (client traffic types #1, #2, #3) are to be encapsulated within Ethernet carrier traffic. To avoid the need to obtain Ethertypes for each type of client traffic to enable their identification within the Ethernet carrier frames, a single adaptation layer is provided that itself can provide the client identification function.

Whereas it is known in the art to encapsulate Ethernet (amongst many other types of communications protocol traffic) within Generic Framing Procedure (GFP) communications protocol traffic, the use of GFP as an adaptation layer for Ethernet is understood to be new by the inventors as this is effectively reversing the protocol stack. A GFP frame is encapsulated and carried within the payload of an Ethernet frame (this assumes that the GFP frame size is sufficiently small to fit within the allocated payload for that Ethernet frame).

Figure 4:
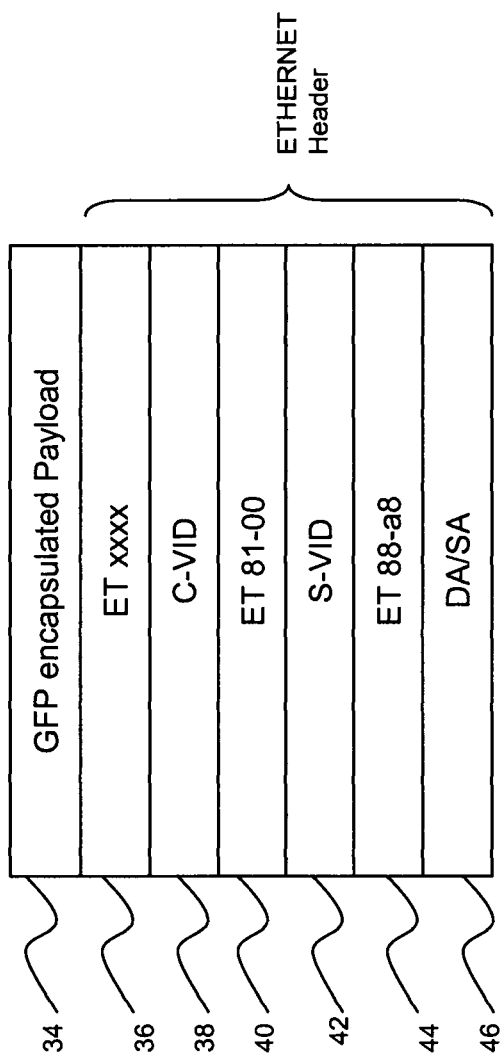
FIG. 4 shows the information captured in an Ethernet frame into which a GFP frame has been mapped according to the invention.

FIG. 4 of the accompanying drawings shows schematically a carrier Ethernet frame according to an embodiment of the invention in which a GFP frame has been encapsulated in the Ethernet payload. In this embodiment, the size of the GFP frame is limited to the size which can be accommodated within the payload 34 of an Ethernet frame. In one embodiment, the Ethernet frame has a minimum payload of 46 bytes and a maximum which is limited by standards to a Maximum Transmission Unit (MTU) of approximately 1500 bytes depending on the specific implementation of the Ethernet communications protocol. Alternatively, other sizes of Ethernet frame, including so called "Jumbo Ethernet frames" above 1500 bytes and up to 9000 bytes, may be used to carry GFP traffic in their payload in other embodiments of the invention. Within the header fields of an Ethernet frame the client traffic encapsulated within the Ethernet payload is identified using a payload Ethertype field shown as "ET xxxx" 36 in FIG. 4.

In one embodiment of the invention, this is provided by an Ethertype which identifies the client traffic as GFP encapsulated. In addition, other header information such as the client Virtual LAN identifier (C-VLAN) 38, an Ethertype for the C-VLAN 40, a server VLAN (S-VLAN) 42, and an Ethertype of the S-VLAN 44, as well as the usual source and/or destination address information DA/SA 46 is provided. Other information well known to those of ordinary skill in the art as forming part of the structure of an Ethernet frame/header is not explicitly described herein but its inclusion is implicit.

By using GFP as an adaptation layer, instead of mapping a range of different client communications protocols into the carrier Ethernet traffic directly, the client traffic signals are mapped into GFP frames and the GFP signal is mapped into Ethernet traffic. This means that only one Ethertype to identify GFP is required.

This is possible as the GFP communications protocol defines a GFP type field which is a two-octet field of the GFP payload header indicating the content and format of the GFP payload information. The type field distinguishes between services in a multi-service environment. The type field comprises a payload type identifier (PTI), a payload FCS indicator (PFI), an Extension header Identifier (EXI) and User Payload Identifier (UPI). It is the UPI field that carries the information of the actual client traffic carried within the GFP encapsulation. More information can be found in "Optical network Standards: A Comprehensive Guide for Professionals" edited by Khurram Kazi, p. 161, published by Springer-Verlag, copyright 2006, the contents of which are hereby incorporated by reference. The payload header in GFP enables multiple transport modes to be supported and, optionally, allows for these multiple transport modes to co-exist within the same transport channel. This enables MPLS traffic and Frame Relay and ESCON traffic for example, to all be mapped into GFP which is then in turn mapped into Ethernet.

Figure 5:
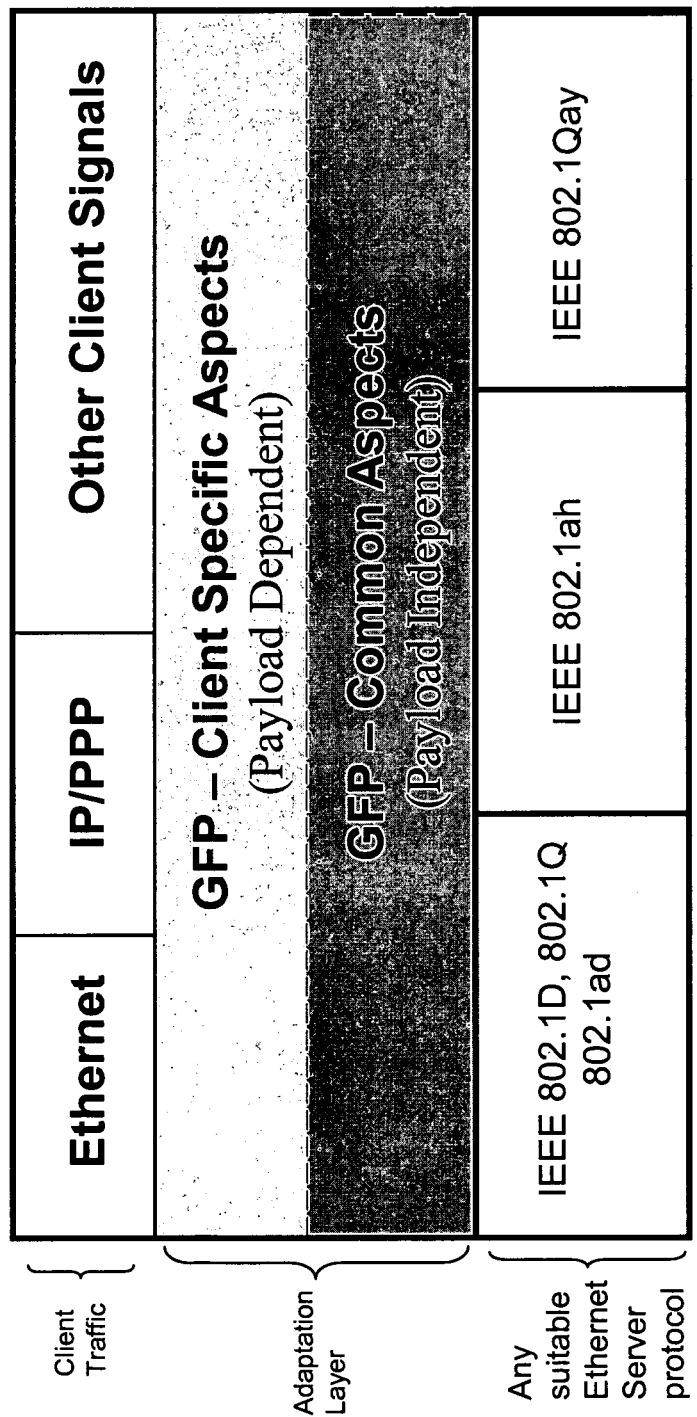
FIG. 5 shows schematically the protocol mapping scheme for GFP frames into Ethernet frames according to an embodiment of the invention.

FIG. 5 of the accompanying drawings shows schematically in more detail the protocol stack which is formed when client signals such as IP/PPP and Ethernet (for example) are mapped into payload dependent (i.e. client specific) GFP adaptation layer according to an embodiment of the invention, and how the payload dependent GFP adaptation layer is mapped into payload independent common aspects of GFP which are then carried according to the respective embodiment into a suitable Ethernet protocol, for example, the Institute of Electrical and Electronics Engineers (IEEE)802.1D standard which is the IEEE MAC Bridges standard. IEEE 802.1D includes Bridging, Spanning Tree, interworking for 802.11 and others. Other suitable protocols include the virtual LAN standard IEEE 802.1Q, the proposed Provider Bridging standard IEEE 802.1ad, the Provider Backbone Bridging proposed standard IEEE 802.1ah, and also Provider Backbone Bridging—Traffic Engineering (PBB-TE) proposed standard IEEE 802.1Qay.

In one embodiment of the invention, one or more client traffic signals 29 (three are shown as client traffic #1, #2, #3, labelled 29a,b,c respectively in an exemplary embodiment of the invention shown in FIG. 3) are carried over a carrier network using a carrier Ethernet communications protocol.

Examples of the different types of client traffic 29 include multi-protocol label switched (MPLS) traffic, ESCON, FICON, connectionless Ethernet traffic, connection-oriented Ethernet traffic, or any client traffic for which a user payload identifier for a GFP client frame is known from the G.7041/ Y.1303 standards, the contents of which are hereby incorporated by reference.

As shown in FIG. 3, the client traffic 29 is encapsulated first within an adaptation layer 30 provided by the GFP communications protocol, using any appropriate mapping scheme already known to those of ordinary skill in the art for mapping the relevant client signal into GFP.

The GFP traffic is then mapped into the carrier Ethernet layer 31 by encapsulating the GFP frame into the payload of the carrier Ethernet frame. This is performed using a communications protocol mapping according to an embodiment of the invention in which a boundary node 24 at the edge of client network 14 processes the received client signals and maps the client data firstly to the payload of GFP protocol frames. Then the node processes one or more GFP frames to form the payload of an Ethernet frame and adds the Ethertype for the GFP encapsulated payload to the appropriate carrier Ethernet header field. In this way, a single Ethertype is used regardless of the number of client signals that are carried by the Ethernet frame. The protocol mapping can be implemented by using any appropriate mapping techniques already known in the art for mapping other client signals into Ethernet but in this case taking the content and header information from one or more of the GFP frames and capturing this information in the payload and header of one or more carrier Ethernet frames as FIG. 4 of the accompanying drawings shows which was described in more detail hereinabove.

According to one embodiment of the invention, if the carrier Ethernet signal 31 is to be carried via connection-oriented circuit-switched mode server layer network, the Ethernet traffic is mapped back into an appropriate adaptation layer 32 for that server, for example, it may use another instance of GFP as is shown in FIG. 3. In this embodiment of the invention, the protocol mapping for client traffic communications protocol "X" is Xover(GFP)ETHover(GFP)SDH. As shown in FIG. 3, the GFP into SDH adaptation layer 32 may optionally also carry other client signals, including "normal" Ethernet, along with the carrier Ethernet. Examples of these other client signals include those shown in FIG. 2.

The adaptation layer 30 according to one embodiment of the invention uses the features of the GFP protocol as defined in the G.7041 standard established by the International Telecommunications Union Telecommunications standardisation sector (ITU-T), the contents of which are hereby incorporated by reference. Those of ordinary skill in the art will be aware that the GFP protocol was intended as a universal mapping mechanism for packets into TDM technologies and as such allows multiple protocols to be supported and is extensible. The preferred embodiment of the invention uses frame-based GFP, but in alternative embodiments of the invention, transparent GFP (GFP-T) is used. GFP-T is an extension to GFP developed to provide efficient low-latency support for high-speed WAN applications including storage area networks. Rather than handling data on a frame-by-frame (packet-by-packet) basis, GFP-T handles block-coded (e.g., 8B/10B) character streams.

Figure 6:
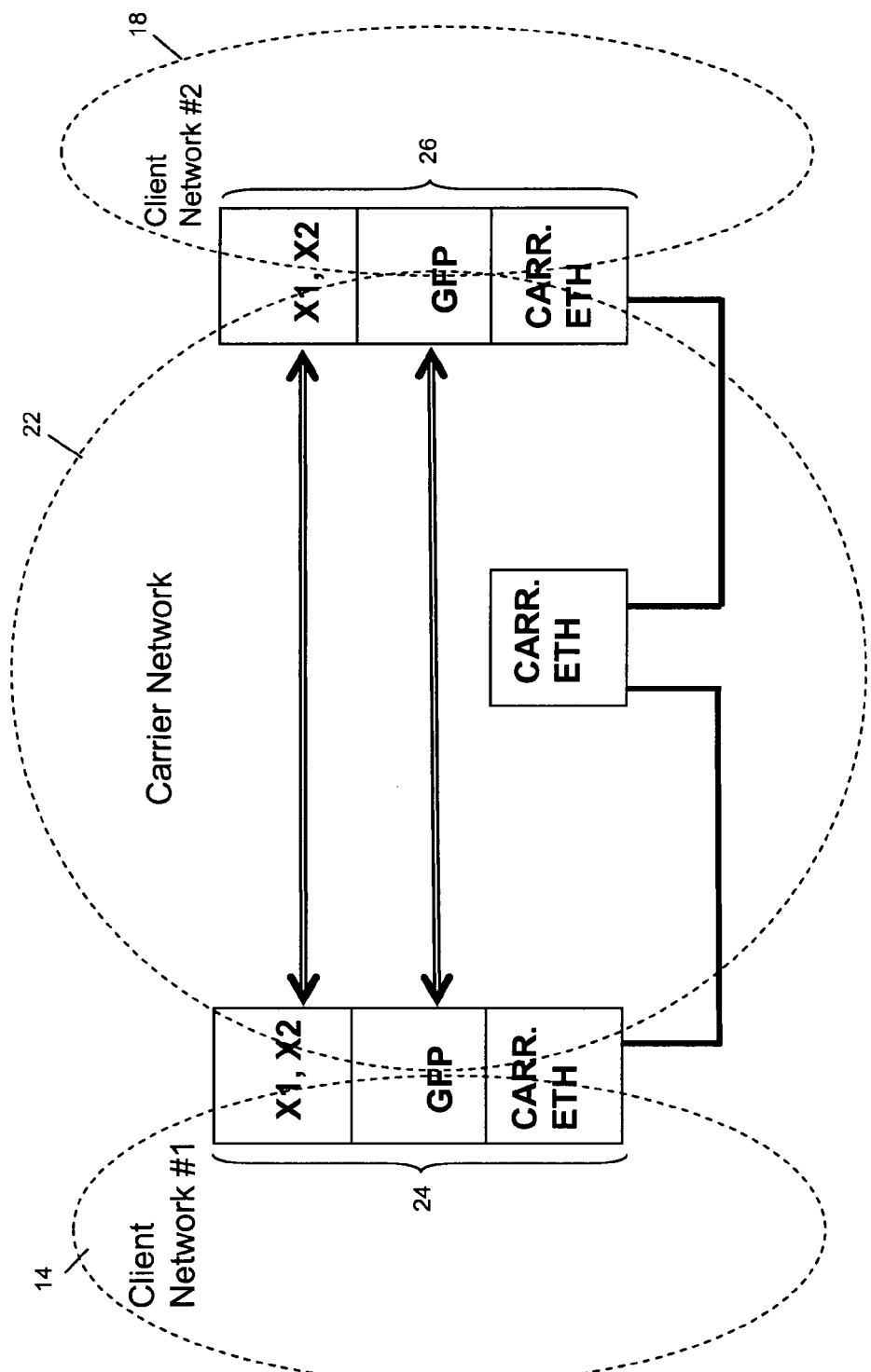
FIG. 6 shows a networking scenario of mapping multiple client protocols via GFP adaptation for carriage across a carrier Ethernet network according to an embodiment of the invention.

FIG. 6 shows a networking scenario of mapping multiple client protocols (X1 and X2 being the examples shown) via GFP adaptation for carriage across a carrier Ethernet network.

In FIG. 6 a given instance of client traffic in a source client network 14 is mapped into a GFP protocol, which is in turn mapped into a carrier Ethernet signal, for example, that provided by a connection-oriented protocol such as PBB-TE.

FIG. 6 shows how the two different communications protocols, X1 and X2, are mapped into the adaptation layer GFP communications protocol at the boundary node 24 between the client network 14 and the Ethernet carrier network 22. The left hand side of FIG. 6 shows the protocol stack visible at the boundary node 24, and the right hand side the protocol stack visible at the boundary node 26. Within the Ethernet carrier network, only the carrier Ethernet signal is processed by carrier nodes such as node 23 shown in FIG. 1. At the boundary node 26 between the Ethernet carrier network 22 and the second part of the client network 18, the carrier Ethernet signal is de-encapsulated to extract the adaptation layer signal and finally the client signal is extracted from the adaptation layer.

In other embodiments of the invention, some of the Ethernet frames carry different types of client frame traffic, and these client frames are multiplexed together using different instances of GFP encapsulation.

As shown in FIG. 6, two different client communication protocol signals, X1 and X2 are encapsulated using the same GFP mechanism which removes the need to obtain a wide variety of Ethertypes when mapping a plurality of different communications protocols into Ethernet. Instead, just one Ethertype is needed to identify the GFP into Ethernet mapping. The Ethernet traffic frames receiving the GFP conform to a connection-oriented communications protocol such as PBB-TE in one embodiment of the invention. However, in alternative embodiments, the GFP communications protocol is mapped into a conventional Ethernet communications protocol or PBB providing connectionless transport.

Not shown in FIG. 6 are the possible further underlying network infrastructure technologies, such as another layer of GFP over SDH or WDM/OTN or directly over Fibre as were shown in FIGS. 2 and 3.

By first mapping client signals into GFP, and then mapping GFP into Ethernet, the number of Ethertypes required to support multiple client traffic types is reduced. One embodiment of the invention also provides a mechanism to support unusual client formats for Ethernet transport. For example, this enables Ethernet frames plus any preamble and SFD (start of frame delimiter) to be mapped into GFP including proprietary variants, and these are then mapped back into Ethernet using a GFP Ethertype.

One embodiment of a mapping scheme according to the invention enables protocols such as PBB-TE to support fully transparent Ethernet services by mapping these into GFP before encapsulating into the PBB-TE layer (e.g. PBB-TE over PBB-TE) as well as the PBB 802.1 ah variant. The invention also provides a mapping scheme which allows GFP to support Ethernet and PBB-TE over SDH/SONET and OTN.

The mapping scheme of the invention requires the client's GFP encapsulated Maximum Transmission Unit (MTU) to fit within an Ethernet frame and requires GFP User Payload Identifiers (UPIs) for Ethernet, PPP (including IP and MPLS), Fiber Channel, FICON, ESCON, and any other protocol which would needed to be carried over Ethernet, such as ATM, Frame Relay, X.25, SMDS, etc. As the GFP Client-Multiplexing capability is an 8 bit field in the payload header a maximum of 256 different client signals can be supported (the practical limit is less than this as some values are reserved and cannot be used for client identification purposes).

In the preferred embodiment, each client signal frame is mapped in a one-to-one mapping process to a GFP frame. Each GFP frame is then mapped in a one-to-one mapping process to an Ethernet frame. This gives an overall mapping of 1:1: for the client:GFP:Ethernet frames. This is shown schematically in FIG. 7a of the accompanying drawings, in which a carrier Ethernet signal (or equivalently a carrier Ethernet channel) comprising a stream of Ethernet frames (only three are shown for clarity in FIG. 7a) carries client traffic frames. Thus as shown schematically in FIG. 7a, the first carrier Ethernet frame carries the first frame of client signal #1, the second carrier Ethernet frame carries the second frame of client signal #1, and the third carrier Ethernet frame carries the third frame of client signal #1.

FIG. 7b shows schematically how it is possible for multiple client signals to be carried in an Ethernet channel. In FIG. 7b, two client signals #1 and #2 are to be carried, each frame of #1 client traffic is mapped to a GFP frame, and each frame of #2 client traffic is mapped to another GFP frame. Accordingly, the first carrier Ethernet frame shown in FIG. 7b carries the first frame of client traffic #1, the second carrier Ethernet frame carries the first frame of client traffic #2, and the third carrier Ethernet frame carries the second frame of client traffic #1. The resulting sequence of GFP frames forming the GFP channel thus can comprise frames with differing client signal payloads. Where the required payload capacity of the carrier Ethernet frame is capable of differing, a check is performed prior to mapping into the Ethernet frames to ensure that sufficient payload capacity is available. The sequence of GFP frames is then mapped to a corresponding sequence of Ethernet frames forming the carrier Ethernet channel as is shown in FIG. 7b.

Thus in one embodiment of the invention, the Ethernet carrier signal comprises a single client signal but in other embodiments where GFP frames containing different client signals are mapped to the Ethernet frames forming the Ethernet carrier signals, a plurality of different clients signals can be mapped into the same Ethernet carrier signal. Both types of embodiments of the invention implement 1:1:1 mapping schemes as shown in FIG. 7a or 7b.

However, in an alternative embodiment, instead of the frames being mapped in a 1:1:1 manner as mentioned hereinabove, it is possible if there is sufficient capacity in the Ethernet payload to map the client frames in a 1:1 manner to the GFP frames and for the GFP frames to be mapped in an N:1 manner into the Ethernet frame payload.

FIGS. 8a and 8b show schematically an embodiment of the invention where 1:1-N:1 mappings are performed. In FIGS. 8a and 8b, N frames of client traffic are mapped to N frames of GFP which are mapped in turn to 1 frame of carrier Ethernet. This can be achieved by providing a sequence indicator in the header of the GFP frames which indicates the position of each GFP frame in a sequence of frames mapped to a carrier Ethernet frame as described herein above. The sequence indicator value is added to the extension field of a GFP frame when it is being encapsulated within the carrier Ethernet frame and is read from the GFP frame extension field when the GFP frame is being de-encapsulated. Alternatively, any other suitable means for indicating the position of the GFP frames in a sequence so as to enable the client payload to be extracted from each GFP frame's payload located within an Ethernet carrier frame known to one of ordinary skill in the art could be used.

In FIG. 8a, the client traffic signals carried in each frame of the Ethernet carrier signal are the same. However, in FIG. 8b, the client traffic signals are different in the same Ethernet carrier frame. The client signals may differ as to their size, source, or comprise differing other characteristics such as, for example, be of different types of communications protocol, in which case the protocol identifier field of the GFP frame encapsulating the differing client signals will differ. In the embodiment shown in FIG. 8b, a single Ethernet channel frame carries three frames of client signals from two different client traffic communications protocols.

Any type of Ethernet communications protocol in which a frame has a sufficiently large enough payload capacity can be used as the carrier signal.

In some embodiments of the invention shown in FIGS. 7a,b and 8a,b, the size of the Ethernet carrier frame payload required is different depending on the size of the client traffic signal frame to be encapsulated by the GFP frame. In one embodiment of the invention, a check is performed in any suitable manner known to those of ordinary skill in the art to ensure that sufficient capacity exists in the payload of the Ethernet frame prior to performing the mapping. In one embodiment, the check is performed dynamically where the frame size of the carrier signal and/or GFP frame is variable regardless of whether 1:1:1 mapping or a 1:1 followed by an N:1 mapping is performed into the carrier Ethernet layer.

An example of an Ethernet frame which may have sufficient capacity to carry a plurality of client signals mapped to a plurality of GFP frames is a Jumbo Ethernet frame, which may have a payload of up to 9000 bytes.

In another alternative embodiment, it may be possible to distribute the GFP mapping between a plurality of Ethernet frames.

FIG. 9A of the accompanying drawings shows a node 40 suitable for use as an access node in a carrier communications network according to an embodiment of the invention. As shown in FIG. 9A, node 40 comprises a receiver 42a, an adaptation processor 44a, a traffic encapsulator 46 and a transmitter 48.

A client traffic signal is shown in FIG. 9A as being received by receiver 42a of node 40. The client traffic signal conforms to a specific type of communications protocol which is processed by a suitable form of signal processing apparatus shown as adaptation processor 44a in FIG. 9A to form adapted communications traffic. The adapted communications traffic is generated by mapping the client traffic data into the payload of adaptation layer communications protocol traffic, for example, each client traffic frame or block can be mapping into one or more frames of GFP-F or one or more blocks of block-encoded GFP-T as appropriate using any suitable technique known to those of ordinary skill in the art. For frame-based GFP a GFP header field is generated which provides a length indicator for the GFP payload, however, for transparent GFP which is block encoded, a fixed number of client characters are mapped into a GFP block which has a pre-determined length.

In one embodiment of the invention a client signal conforms to a communications protocol which is protocol data unit (PDU) oriented, for example, the Internet Protocol/Point-to-Point protocol (IP/PPP) or the Ethernet Media Access Control, and each PDU of client traffic is encapsulated within the payload (a term also referred to in the art as a Service Data Unit) of one or more GFP frames (depending on whether the type of mapping the traffic adaptor 44a performs is a 1:1:1 mapping or 1:N:N mapping as described hereinabove). In another embodiment, where a client traffic signal is block-code oriented, such as, for example, fibre channel client signal, a fixed number of client bits are block encoded into each GFP-T block in one embodiment of the invention.

The GFP traffic which is generated is then encapsulated by encapsulator 46 within the payload area of Ethernet traffic, on a frame-by-frame basis according to one embodiment of the invention or on a one or more GFP blocks-to-frame basis according to another embodiment of the invention. The Ethernet traffic is then transmitted out over an Ethernet carrier network (not shown) by transmitter 48 in the embodiment of the invention shown in FIG. 9A. As will be appreciated by those of ordinary skill in the art, different functional components shown in FIG. 9A may be combined into a single component where appropriate, for example, the functionality provided by adaptation processor 44 and encapsulator 46 may be combined into a single signal processing component 47 indicated in FIG. 9A by the box with the dashed outline.

Conventionally the protocol data unit of a communications protocol at layer N in the Open Systems Interconnection (OSI) reference mode is sent between protocol entities at layer N. In OSI, a PDU at layer N comprises layer N header information and an encapsulated message from layer N+1. The encapsulated message from layer N+1 is the layer N SDU and the PDU of layer N+1.

In some embodiments of the invention, however, the OSI hierarchy is not necessarily maintained. In one embodiment client traffic comprises Ethernet communications traffic. In such an example, the invention results in an Ethernet-into-GFP-into-Ethernet protocol stack. It is possible to further iterate this recursion of the protocol stack a number of times. In another example, the Ethernet carrier traffic may itself be mapped into GFP, resulting in GFP-into-Ethernet-into GFP, which again may be iterated further. Eventually, however, in any of these embodiments the stack recursion will terminate and the traffic protocol stack will be finally encapsulated within the payload of a transport network such as, for example, a synchronous transport network packet, such as the Synchronous Digital Hierarchy (SDH) or Synchronous Optical NETwork (SONET).

In another embodiment of the invention node 40 is arranged to receive a plurality of different types of client signals and map these to a carrier Ethernet signal. In FIG. 9B, the same elements shown as in FIG. 9A appear, but in addition to the client traffic shown in FIG. 9A which is indicated as being of type A and additional client traffic is shown in 9B comprising client traffic of type B. FIG. 9B shows a second client signal processing stream within the node which results in the carrier Ethernet traffic stream transmitted out from node 40 carrying client signals from each different type of client communications protocol.

In FIG. 9B, client traffic of type B is received by receiver 42b and is processed by adaptation processor 44b into an adapted form of communications traffic as described hereinabove in the context of FIG. 9A. The GFP traffic carrying client traffic of type B is shown in FIG. 9B as being encapsulated into the payload of Ethernet traffic using the same signal data processor used to encapsulate client traffic of type A into the payload of carrier Ethernet traffic. Persons of ordinary skill in the art however will be aware that one or more of the separate functional components for one or more of types of client traffic may be combined into one functional component as is indicated in FIG. 9B by the box with the dashed outline. In FIG. 9B, the adaptation processors 44a and 44b both provide the adapted traffic to encapsulator 46. Persons of ordinary skill in the art will appreciate that the two traffic streams could be independently encapsulated into carrier Ethernet traffic frames with each stream of Ethernet traffic then being multiplexed prior to transmission by transmitter 48 into a single Ethernet carrier service channel. Alternatively, GFP frames for each client traffic stream could be multiplexed into the same Ethernet frame so that the client traffic is multiplexed within the Ethernet channel within each carrier Ethernet frame. An example of a node which performs the encapsulation functionality of node 40 as shown in FIG. 9A or 9B is boundary node 24 shown in FIG. 1A.

FIG. 10A of the accompanying drawings shows a boundary node 50 in a communications network comprising a receiver 52 for Ethernet traffic, a traffic processor 57 comprising a first signal processing component 54 arranged to process Ethernet signals and a second signal processing component 56a arranged to process GFP signals, and a transmitter 58a for transmitting client traffic out over a client network (not shown in FIG. 10A).

In FIG. 10A, each Ethernet traffic frame is received by Ethernet traffic receiving apparatus shown as receiver 52. Each frame of Ethernet traffic received is processed by traffic processor 57. First, the header information of a received Ethernet frame is processed by first processor 54 in a first processing step to read from the Ethertype header field the Ethertype for the communications protocol of the data carried within the payload of that Ethernet frame. In one embodiment of the invention, the adaptive communications protocol comprises a generic framing procedure (GFP) protocol.

As shown in FIG. 10A, when a received Ethernet traffic header is processed, first data processor 54 determines the type of payload present. If the Ethertype indicates an adaptation layer payload is provided such as a GFP Ethertype, then within the Ethernet payload the GFP core header is located. The GFP core header is processed to determine the GFP payload-length indicator. After the core header, the GFP payload is provided which includes a payload header which may include an indicator if an extension to the GFP payload header is present. The GFP payload information data is optionally followed by a payload frame check sequence field. This information provided within each GFP frame enables the size of each GFP frame to be determined and further enables the client signal to be de-encapsulated from the payload of each GFP frame in either directly from the Ethernet payload area by first processor 54 or by firstly de-encapsulating the GFP frame and then by de-encapsulating the client signal data from each de-encapsulated GFP frame in a second processing step, for example, which is performed by a second processor 56 as shown in FIG. 10A. Once client traffic has been extracted by signal processor 57 it is transmitted using an appropriate transmitter 58a (assuming that node 50 is not the final destination of the client traffic) over the client traffic network (not shown in FIG. 10A).

In one embodiment of the invention, node 50 receives a carrier Ethernet signal which comprises GFP traffic which has encapsulated a plurality of client traffic frames which differ as to the type of communications protocol they conform to. FIG. 10B shows an embodiment in which node 50 comprises a receiver 52 arranged to receive carrier Ethernet signals which comprise client signals conforming to two different types of communication protocol.

As shown in FIG. 10B, signal processor 59 shown by the dashed-line outlined box comprises a first signal processor 54 which provides functionality to process a received Ethernet frame to determine if the Ethernet frame has GFP traffic in its payload by processing the Ethernet frame header Ethertype field. If the Ethernet header Ethertype field indicates the Ethernet payload comprises GFP traffic, the Ethernet frame is then processed to extract the GFP client payload by processing the GFP header payload length indicator field, and also the GFP payload field to determine if a GFP extension header is present. This additional processing is shown in FIG. 10B as being performed by a separate functional component 56b for client signals of type B and by a separate functional component 56a for client signals of type A but as those of ordinary skill in the art will be aware, the additional processing to extract the different types of client traffic from the GFP payload could instead by performed by a same processor. Once extracted the different types of client signal are transmitted out over their respective client networks by receivers 58a, 58b as shown in FIG. 10B.

Where a plurality of frames are mapped into an Ethernet payload, the adaptation layer frames may include within an extension header one or more sub-field values which indicate their position within the Ethernet payload. The values are written into the extension header when the adaptation layer frames are being encapsulated within the Ethernet payload area.

A plurality of client signals can also be encapsulated within a carrier Ethernet frame using a hierarchical mapping scheme for GFP as described in the inventor's co-pending GB patent application entitled "ADAPTATION SCHEME FOR COMMUNICATIONS TRAFFIC" which claims priority from United Kingdom Patent Application number GB0800573.8, the full contents of which are hereby incorporated by reference.

A client signal comprises data capable of being represented by a sequence of bits. The data structure of the client signal comprises, for example, a sequence of one or more PDUs. A carrier signal comprises data capable of being represented by a sequence of bits. The data structure of the carrier signal comprises, for example, a sequence of one or more PDUs, each comprising a header followed by a SDU within which the PDU of another communications signal is encapsulated according to the invention.

Those of ordinary skill in the art will be aware of modifications and functional equivalents to the functional components described in the above embodiments of the invention, and the scope of the claims should be interpreted to include such variations to the described embodiments where they are apparent to one of ordinary skill in the art.

What is claimed is:

1. A method of adapting a client signal from a client network for encapsulation within a carrier Ethernet signal for transport over a carrier Ethernet network, the method comprising:

mapping said client signal within a generic framing procedure adaptation layer signal; and mapping, using a processing system including a computer processor, said generic framing procedure adaptation layer signal into said carrier Ethernet signal, wherein said client signal is identified within said generic framing procedure adaptation layer signal when said generic framing procedure signal is transported within said carrier Ethernet signal over the carrier Ethernet network.

2. A method as claimed in claim 1, wherein each said carrier Ethernet signal carries a plurality of different client signals.

3. A method as claimed in claim 1, wherein a frame of said client signal is mapped within a frame of said carrier Ethernet signal.

4. A method as claimed in claim 1, wherein a plurality of frames of said client signal is mapped within a frame of said carrier Ethernet signal.

5. A method as claimed in claim 1, wherein said carrier Ethernet signal conforms to a connection-oriented packet switched Ethernet communications protocol.

6. A method as claimed in claim 1, wherein mapping said generic framing procedure adaptation layer signal into said carrier Ethernet signal comprises mapping a plurality of frames of said adaptation layer signal to a frame of the carrier Ethernet signal.

7. A method as claimed in claim 6, wherein said plurality of frames of said generic framing procedure adaptation layer signal each encapsulate a frame of said client signal, and said plurality of frames of said generic framing procedure adaptation layer signal is encapsulated within said frame of the carrier Ethernet signal.

8. A method as claimed in claim 7, wherein
at least one of said plurality of frames of said generic framing procedure adaptation layer signal encapsulates a client signal frame which conforms to a communications protocol different from the communications protocol of a client signal encapsulated in another one of said plurality of frames of said generic framing procedure adaptation layer signal, and
wherein said plurality of frames of said generic framing procedure adaptation layer signal carrying the client signals conforming to differing communications protocols are encapsulated within said frame of the carrier Ethernet signal.

9. A method as claimed in claim 1, further comprising:
determining the amount of payload required to convey a frame of said encapsulated client traffic; and
verifying the payload required is available in a frame of said carrier Ethernet signal.

10. A method as claimed in claim 1, wherein said carrier Ethernet signal comprises Jumbo Ethernet frames.

11. A method as claimed in claim 1, wherein said generic framing procedure adaptation layer signal is identified in the carrier Ethernet signal and wherein the data structure of said generic framing procedure adaptation layer signal indicates the position and length of the client data in the bit stream comprising the carrier Ethernet signal.

12. A method as claimed in claim 1, wherein said generic framing procedure adaptation layer signal is identified in each frame of the carrier Ethernet signal by an Ethertype value provided in the Ethertype field of the frame header.

13. A method of de-encapsulating a client signal encapsulated within a frame of a carrier Ethernet signal, the method comprising:
receiving the carrier Ethernet signal;
determining that a generic framing procedure adaptation layer signal is encapsulated within said carrier Ethernet signal;
processing said generic framing procedure adaptation layer signal to identify said client signal within said generic framing procedure adaptation layer signal, and
de-encapsulating said client signal from said generic framing procedure adaptation layer signal.

14. A method as claimed in claim 13, wherein each received said Ethernet frame has an Ethernet frame header and an associated payload, and wherein said Ethernet frame header is processed to determine if the associated payload comprises adaptation layer signal data by identifying if the Ethernet frame header contains an Ethertype indicating the Ethernet payload area comprises data conforming to the communications protocol of said adaptation layer.

15. A method as claimed in claim 13, wherein the Ethernet payload area is processed to determine from said adaptation layer data the position and length of one or more client signals encapsulated within the Ethernet payload area in order to de-encapsulate the client signal.

16. A method as claimed in claim 15, wherein a plurality of client signals are encapsulated within the payload of each carrier Ethernet frame and wherein the method further comprises processing the Ethernet payload area until all of the client signals are de-encapsulated.

17. A method of de-encapsulating a client signal encapsulated within a frame of a carrier Ethernet signal, the method comprising:
de-encapsulating a generic framing procedure adaptation layer signal from said carrier Ethernet signal to extract a plurality of generic framing procedure adaptation layer frames;
processing each said de-encapsulated frame of said generic framing procedure adaptation layer signal to identify a frame of said client signal within said generic framing procedure adaptation layer signal, and
de-encapsulating each said frame of said client signal from said generic framing procedure adaptation layer signal.

18. Apparatus comprising a computer processing system arranged to implement adaptation of a client signal from a client network for encapsulation within a carrier Ethernet signal for transport over a carrier Ethernet network, the computer processing system being configured at least to:
map said client signal within a generic framing procedure adaptation layer signal; and
map said generic framing procedure adaptation layer signal into said carrier Ethernet signal, wherein said client signal is identified within said generic framing procedure adaptation layer signal when said generic framing procedure signal is transported within said carrier Ethernet signal over the carrier Ethernet network.

19. Apparatus arranged to adapt a client signal received from a client network for encapsulation within a frame of a carrier Ethernet signal for transport over a carrier Ethernet network, the apparatus comprising:
a computer processing system configured to:
encapsulate said client signal within a generic framing procedure adaptation layer signal;
encapsulate said generic framing procedure adaptation layer signal into said carrier Ethernet signal, whereby said client signal is identified within said generic framing procedure adaptation layer signal.

20. Apparatus arranged to de-encapsulate a client signal encapsulated within a frame of a carrier Ethernet signal, the apparatus comprising:
a receiver arranged to receive the carrier Ethernet signal; and
a computer processing system configured to:
determine if a generic framing procedure adaptation layer signal is encapsulated within said carrier Ethernet signal;
process said generic framing procedure adaptation layer signal to identify said client signal within said generic framing procedure adaptation layer signal, and
de-encapsulate said client signal from said generic framing procedure adaptation layer signal.

21. Apparatus as claimed in claim 19, wherein each received Ethernet frame header is processed to determine if an Ethertype indicating the Ethernet payload area comprises generic framing procedure communications data is present to determine if a generic framing procedure adaptation layer signal is encapsulated within said frame of said carrier Ethernet signal.

22. Apparatus as claimed in claim 19, wherein said processing system is further configured to process the Ethernet payload area to determine from said generic framing procedure adaptation layer signal the position and length of the client signal encapsulated within the Ethernet payload area in order to de-encapsulate the client signal.

23. Apparatus arranged to de-encapsulate the client signal from within a frame of a carrier Ethernet signal, the apparatus comprising:

a computer processing system configured to:
- de-encapsulate said generic framing procedure adaptation layer signal from said carrier Ethernet signal to extract a plurality of generic framing procedure frames;
- process each said de-encapsulated frame of said generic framing procedure adaptation layer signal to identify a frame of said client signal within said generic framing procedure adaptation layer signal, and
- de-encapsulate each said frame of said client signal from said generic framing procedure adaptation layer signal.

24. An apparatus arranged to adapt a client signal for encapsulation within a carrier Ethernet signal, the apparatus comprising:
a computer processing system configured to:
- encapsulate said client signal within a generic framing procedure adaptation layer signal; and
- encapsulate said generic framing procedure adaptation layer signal into said carrier Ethernet signal, whereby said client signal is identified within said generic framing procedure signal;
wherein each received Ethernet frame header is processed to determine if an Ethertype indicating the Ethernet payload area comprises generic framing procedure communications data is present to determine if a generic framing procedure adaptation layer signal is encapsulated within said carrier Ethernet frame.

25. An apparatus arranged to adapt a client signal for encapsulation within a carrier Ethernet signal, the apparatus comprising:
a computer processing system configured to:
- encapsulate said client signal within a generic framing procedure adaptation layer signal;
- encapsulate said generic framing procedure adaptation layer signal into said carrier Ethernet signal, whereby said client signal is identified within said generic framing procedure signal; and
- process the Ethernet payload area to determine from said generic framing procedure data the position and length of the client signal encapsulated within the Ethernet payload area in order to de-encapsulate the client signal.

* * * * *

UNITED STATES PATENT AND TRADEMARK OFFICE
CERTIFICATE OF CORRECTION

PATENT NO. : 8,615,022 B2  Page 1 of 1
APPLICATION NO. : 12/808837
DATED : December 24, 2013
INVENTOR(S) : Harrison et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this
Twenty-second Day of September, 2015

Michelle K. Lee
*Director of the United States Patent and Trademark Office*